(12) United States Patent
Kim et al.

(10) Patent No.: US 10,007,054 B2
(45) Date of Patent: Jun. 26, 2018

(54) BACKLIGHT ASSEMBLY AND DISPLAY DEVICE HAVING THE SAME

(71) Applicant: Samsung Display Co., Ltd., Yongin, Gyeonggi-Do (KR)

(72) Inventors: Kyung Min Kim, Hwaseong-si (KR); Young Chun Kim, Seoul (KR); Seung Hwan Baek, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 81 days.

(21) Appl. No.: 14/606,196

(22) Filed: Jan. 27, 2015

(65) Prior Publication Data

US 2015/0369993 A1 Dec. 24, 2015

(30) Foreign Application Priority Data

Jun. 19, 2014 (KR) ........................ 10-2014-0074954

(51) Int. Cl.
*F21V 7/04* (2006.01)
*F21V 8/00* (2006.01)

(52) U.S. Cl.
CPC ........... *G02B 6/009* (2013.01); *G02B 6/0023* (2013.01); *G02B 6/0026* (2013.01); *G02B 6/0073* (2013.01); *G02B 6/0083* (2013.01); *G02B 6/0091* (2013.01)

(58) Field of Classification Search
CPC .... G02B 6/009; G02B 6/0026; G02B 6/0073; G02B 6/0083
USPC ...................................................... 362/610
See application file for complete search history.

(56) References Cited

U.S. PATENT DOCUMENTS

| | | | | |
|---|---|---|---|---|
| 7,808,012 B2* | 10/2010 | Masuda | ................. | C04B 35/22 257/88 |
| 8,294,168 B2 | 10/2012 | Park et al. | | |
| 2006/0103589 A1* | 5/2006 | Chua | ................... | G02B 6/0023 345/3.1 |
| 2008/0019145 A1* | 1/2008 | Cho | ................. | G02F 1/133606 362/601 |
| 2011/0037926 A1* | 2/2011 | Tsukahara | ........... | G02B 6/0023 349/64 |
| 2011/0090696 A1* | 4/2011 | Nagai | ................... | H01L 33/505 362/293 |
| 2012/0039090 A1* | 2/2012 | Jiang | .................... | G02B 6/0091 362/613 |
| 2012/0113672 A1 | 5/2012 | Dubrow et al. | | |

(Continued)

FOREIGN PATENT DOCUMENTS

KR 10-2011-0133398 A 12/2011
KR 10-2012-0049532 A 5/2012

(Continued)

*Primary Examiner* — Evan Dzierzynski
(74) *Attorney, Agent, or Firm* — H.C. Park & Associates, PLC (57) ABSTRACT

A backlight assembly includes a circuit substrate, a light source arranged on the circuit substrate, a light guide plate having a first surface configured to receive light emitted from the light source and a second and different surface to emit light, a wavelength converting unit arranged between the light source and the light guide plate and a spacer arranged around the light source. The spacer is spaced apart from the light source in a direction perpendicular to the light-emitting direction of the light emitted from the light source.

17 Claims, 5 Drawing Sheets

(56) References Cited

U.S. PATENT DOCUMENTS

| | | | | |
|---|---|---|---|---|
| 2012/0163023 | A1* | 6/2012 | Kim | G02B 6/0085 |
| | | | | 362/611 |
| 2012/0257414 | A1* | 10/2012 | Park | G02B 6/0068 |
| | | | | 362/611 |
| 2013/0050612 | A1 | 2/2013 | Hur et al. | |
| 2014/0293616 | A1* | 10/2014 | Van Bommel | B29D 11/00663 |
| | | | | 362/311.02 |
| 2015/0338064 | A1* | 11/2015 | Ishino | G02F 1/133615 |
| | | | | 349/61 |

FOREIGN PATENT DOCUMENTS

| | | |
|---|---|---|
| KR | 10-2013-0022714 A | 3/2013 |
| KR | 10-2013-0034152 A | 4/2013 |
| KR | 10-2013-0120486 A | 11/2013 |

\* cited by examiner

BACKLIGHT ASSEMBLY AND DISPLAY DEVICE HAVING THE SAME

CLAIM OF PRIORITY

This application claims priority to and the benefit of Korean Patent Application No. 10-2014-0074954, filed on Jun. 19, 2014, with the Korean Intellectual Property Office, the disclosure of which is incorporated herein in its entirety by reference.

BACKGROUND OF THE INVENTION

Field of the Invention

The present disclosure of invention relates to a backlight assembly including a spacer configured to easily bond and fix a wavelength converting unit to a light source unit for a backlight assembly in a display device.

Description of the Related Art

A liquid crystal display (LCD) is a type of flat panel display (FPD) that is the most widely used these days. The LCD includes two substrates having electrodes formed thereon and a liquid crystal layer interposed therebetween. Upon applying voltage to the electrodes, liquid crystal molecules of the liquid crystal layer are rearranged, thereby adjusting the amount of transmitted light.

Meanwhile, a low-power high-efficiency light emitting diode (LED) has been widely used as a light source in recent years. The LED light source emits blue light and provides white light by using other color converting materials, such as a phosphor and the like. The blue light is later converted to white light, such that full color display is realized through a color filter of a liquid crystal panel. As a result, there has been increased emphasis on research to improve color reproducibility of blue light.

Accordingly, it is suggested that a quantum dot rail be inserted between a blue LED light source and a light guide plate, such that the backlight assembly can realize white light having high color reproducibility. The quantum dot rail is an element that can increase color reproducibility by injecting a phosphor within a glass capillary wall. The quantum dot rail is manufactured in a tube form made of a glass material, such that a phosphor ends up being non-uniformly arranged, however properties of thermal conductivity, color reproducibility and shock resistance may be reduced.

In order to improve upon the drawbacks of the quantum dot rail, a quantum dot disk structure has been suggested. The quantum dot disk is an element that can increase color reproducibility by injecting a phosphor between two glasses having a flat panel form. The quantum dot disk is manufactured in a flat disk or panel form instead of a tube form, such that the non-uniformity of a phosphor can be reduced. However, in this case, a mold frame is additionally required in order to fix the quantum dot disk onto the circuit substrate of the light source module.

It is to be understood that this background of the technology section represents the Inventors understanding of the deficiencies in the field, and is also intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein, and therefore does not necessarily constitute prior art as per 35 U.S.C. § 102.

SUMMARY OF THE INVENTION

The present disclosure of invention is directed to a backlight assembly including a spacer configured to fix a wavelength converting unit and light source unit in a backlight assembly in a display device.

According to an aspect of the present invention, there is provided a backlight assembly that includes a circuit substrate, a light source arranged on the circuit substrate, a light guide plate having a first surface configured to receive light emitted from the light source and a second and different surface to emit light, a wavelength converting unit arranged between the light source and the light guide plate and a spacer arranged around the light source. The spacer is spaced apart from the light source in a direction perpendicular to the light-emitting direction of the light emitted from the light source.

The spacer may be arranged between the circuit substrate and the wavelength converting unit. The spacer may surround the light source. The spacer may have an opening toward a light-emitting direction of the light emitted from the light source. The light source may includes a plurality of light sources arranged in an alignment direction, the spacer may be arranged along the alignment direction. The spacer may include a first spacer and a second spacer arranged to face each other with the light source being interposed therebetween.

The wavelength converting unit may include a light transmission unit that allows the light emitted from the light source to pass through. The light transmission unit may include a first glass and a second glass arranged to face each other. The wavelength converting unit may also include a phosphor arranged between the first glass and the second glass. The wavelength converting unit may include a sealing member configured to bond the first glass to the second glass.

The backlight assembly may also include a metal pattern spaced apart from the spacer and configured to support the wavelength converting unit. The phosphor may include a plurality of quantum dot particles. The phosphor may include green conversion particle and a red conversion particle. The green conversion particle may have a smaller diameter than the red conversion particle. The quantum dot particle may have a diameter of 2 nm to 10 nm. The quantum dot particle may include a core comprised of semiconductor particles that are composed of compounds of Group II-VI elements and an outer shell surrounding the core. The core may include at least one of CdSe, CdTe, and CdS. The outer shell may include CdSe. The wavelength converting unit may have either a bar shape or a line shape.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, with reference to FIGS. 1 and 2, a backlight assembly and a display device according to an embodiment of the present invention will be described in detail. A liquid crystal panel 200 is described as an embodiment of the present invention; however, embodiments of the present invention are not limited thereto. Thus, other than the liquid crystal panel 200, any structures provided in a panel form capable of receiving light from a backlight assembly 400 to display an image can be applied to embodiments of the present invention.

Figure 1:
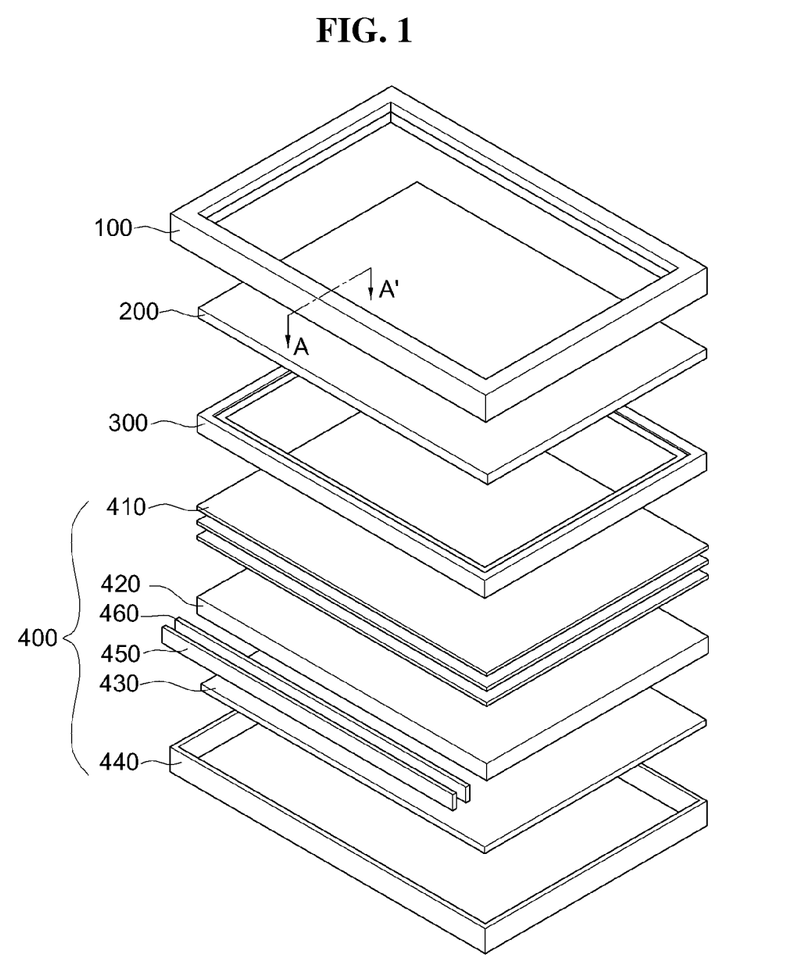
FIG. 1 is an exploded perspective view illustrating a display device according to a first embodiment of the present invention.
Figure 2:
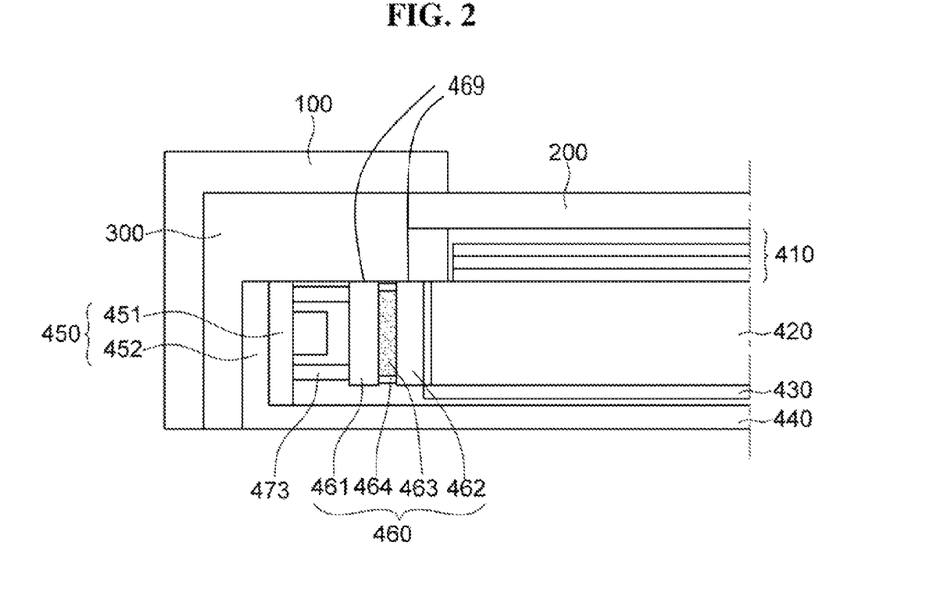
FIG. 2 is a cross-sectional view taken along a line A-A' of FIG. 1.

Turning now to FIGS. 1 and 2, FIG. 1 is an exploded perspective view illustrating a display device according to a first embodiment of the present invention and FIG. 2 is a cross-sectional view taken along a line A-A' of FIG. 1.

Referring now to FIGS. 1 and 2, the display device includes a liquid crystal panel 200 configured to display an image, a backlight assembly 400 configured to supply light to the liquid crystal panel 200, a top case 100 provided to cover the liquid crystal panel 200, and a mold frame 300 configured to connect the top case 100 to a bottom case 440 and accommodate the liquid crystal panel 200 seated thereon.

The mold frame 300 is coupled to the bottom case 440 and accommodates the liquid crystal panel 200. The mold frame 300 may be made out of a flexible material, such as plastic, in order to prevent damage to the liquid crystal panel 200.

The top case 100 is coupled to the mold frame 300 and to the bottom case 440 to cover the liquid crystal panel 200 seated on the mold frame 300. The top case 100 has an open window located in the middle to expose a display area of the liquid crystal panel 200. The top case 100 may be coupled to the mold frame 300 and to the bottom case 440 by hooks and/or screws. Further, the top case 100 and the bottom case 440 can be coupled to each other in a variety of methods.

The backlight assembly 400 includes an optical sheet 410, a light guide plate 420, a reflective sheet 430, the bottom case 440, a light source unit 450, and a wavelength converting unit 460. The light source unit 450 includes a light source 451 and a circuit substrate 452 on which the light source 451 is disposed. The circuit substrate 452 is made of, for example, a printed circuit board (PCB) or a metal PCB. The light source unit 450 may be arranged on edge portions or light incident surfaces of the light guide plate 420. That is, the light source unit 450 may emit light toward one or more edge portions or the light incident surfaces of the light guide plate 420.

The light source 451 may include at least one LED chip (not illustrated) and a package (not illustrated) for accommodating the LED chip. The light source 451 may have a light emission surface facing the light incident surface of the light guide plate 420.

Such light source units 450 may be formed on one side surface, each of two side surfaces, or each of four side surfaces of the light guide plate 420, or on at least one edge portion of the light guide plate 420 in consideration of the size, the brightness uniformity, and/or other factors associated with the display panel 110. Light emitted from the light source 451 is incident on at least one light incident surface of the light guide plate 420, and is emitted towards the light emission surface of the light guide plate 420.

The light guide plate 420 may uniformly supply light provided from the light source unit 450 to the liquid crystal panel 200. The light guide plate 420 is disposed close to the light source unit 450 and is accommodated within the bottom case 440. The light guide plate 420 may be provided in a form of, for example, a quadrilateral plate analogous to that of the liquid crystal panel 200. However, embodiments of the present invention are not limited thereto, and thus, in a case where an LED is used as a light source 451, the light guide plate 420 may have various other forms and may include predetermined grooves, protrusions, and other structures in accordance with the positions of the light source 451.

The light guide plate 420 is, for ease of description, depicted as a plate; however, the light guide plate 420 may be provided in a form of a sheet or a film to achieve slimness. In other words, the light guide plate 420 is to be understood as having a concept including a plate and a film for guiding light. The light guide plate 420 may be made out of a light-transmissive material such as, for example, an acrylic resin such as poly(methyl methacrylate) (PMMA) or polycarbonate (PC) to guide light efficiently. A pattern may be formed on at least one surface of the light guide plate 420. For example, a scattering pattern (not illustrated) may be formed on a bottom surface to scatter and/or reflect the guided light upwards.

The optical sheet 410 is disposed on an upper portion (i.e. an emission side) of the light guide plate 420 and may diffuse and/or collect light transmitted from the light guide plate 420. The optical sheet 410 may include one or more of a diffusion sheet, a prism sheet, a protective sheet, and other functional sheets. The diffusion sheet may disperse light incident from the light guide plate 420 to prevent the light from being partly concentrated. The prism sheet may include prisms having a triangular cross-section and may be arranged in a predetermined arrangement on one surface. The prism sheet may be disposed on the diffusion sheet, and may collect light diffused from the diffusion sheet in a direction perpendicular to the liquid crystal panel 200. The protective sheet may be formed on the prism sheet to protect a surface of the prism sheet and to diffuse light to make light distribution uniform.

The reflective sheet 430 is disposed between the light guide plate 420 and the bottom case 440, so that light emitted downwards from the light guide plate 420 is reflected toward the liquid crystal panel 200, thereby increasing light efficiency. The reflective sheet 430 may be made out of, for example, polyethylene terephthalate (PET), thereby achieving a reflectance property. One surface of the reflective sheet may be coated with a diffusion layer containing, for example, titanium dioxide. In an embodiment, the reflective sheet 430 may include a material containing a metal, such as silver (Ag).

The bottom case 440 may accommodate the reflective sheet 430 and the light guide plate 420. A bottom surface of the bottom case 440 is formed in parallel to the light guide plate 420. The bottom case 440 may be made out of a metal material having rigidity, such as stainless steel, or a material having good heat dissipation properties, such as aluminum or an aluminum alloy. According to an embodiment of the present invention, the bottom case 440 is responsible for maintaining a framework of the display device and protecting a variety of components accommodated therein.

In order to realize white light having high color reproducibility with such a backlight assembly structure, the wavelength converting unit 460 is disposed between the light source unit 450 and the light guide plate 420. Hereinafter, a spacer 473 and the wavelength converting unit 460 configured to protect the light source 451 and fix the wavelength converting unit 460 to the light source unit 450 will be described in more detail with reference to FIGS. 2 to 5.

Figure 3:
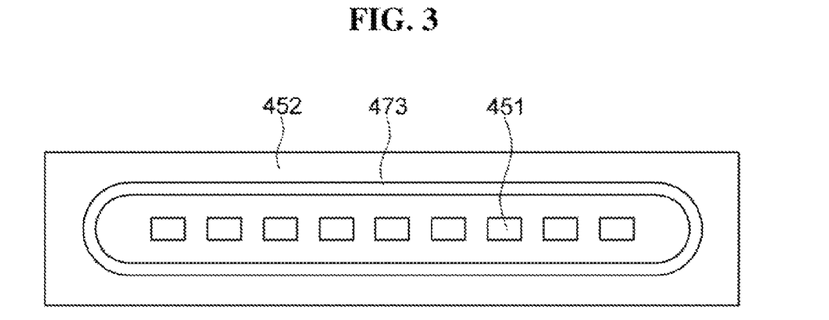
FIG. 3 is a plan view showing a light source module and a spacer illustrated in FIGS. 1 and 2.
Figure 4:
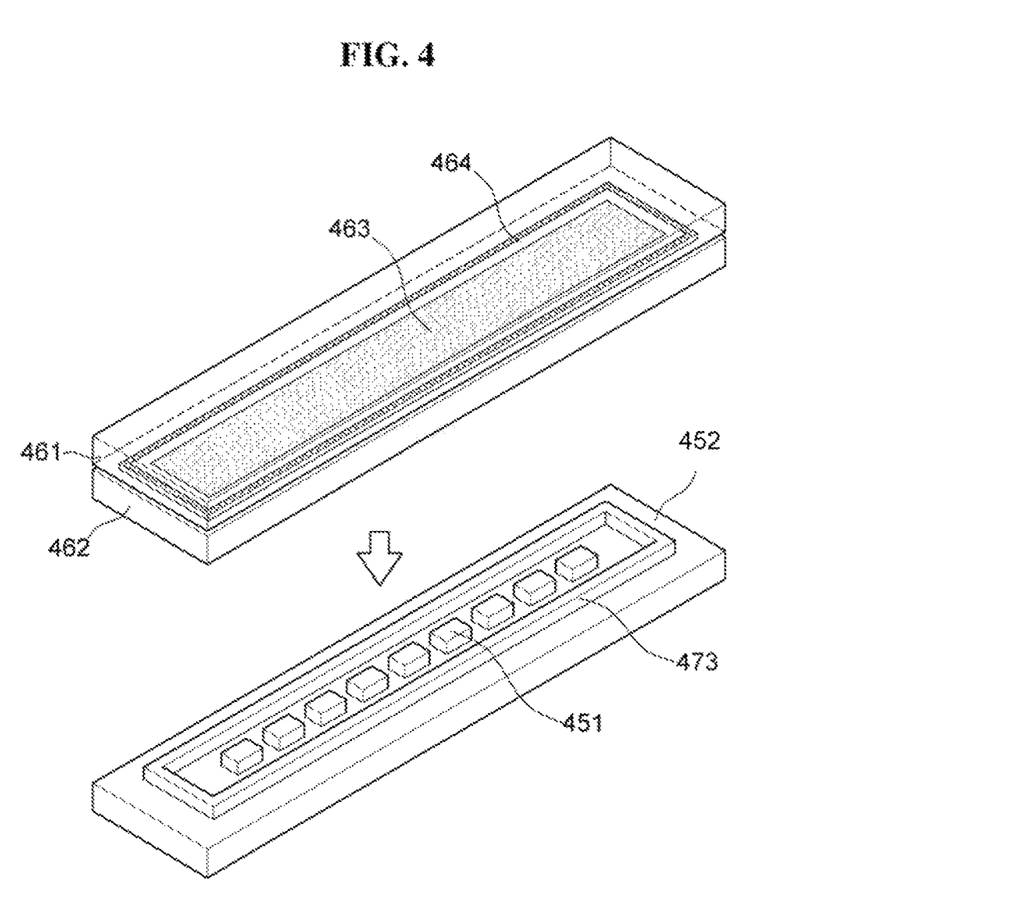
FIG. 4 is an exploded perspective view showing a wavelength converting unit and a spacer.
Figure 5:
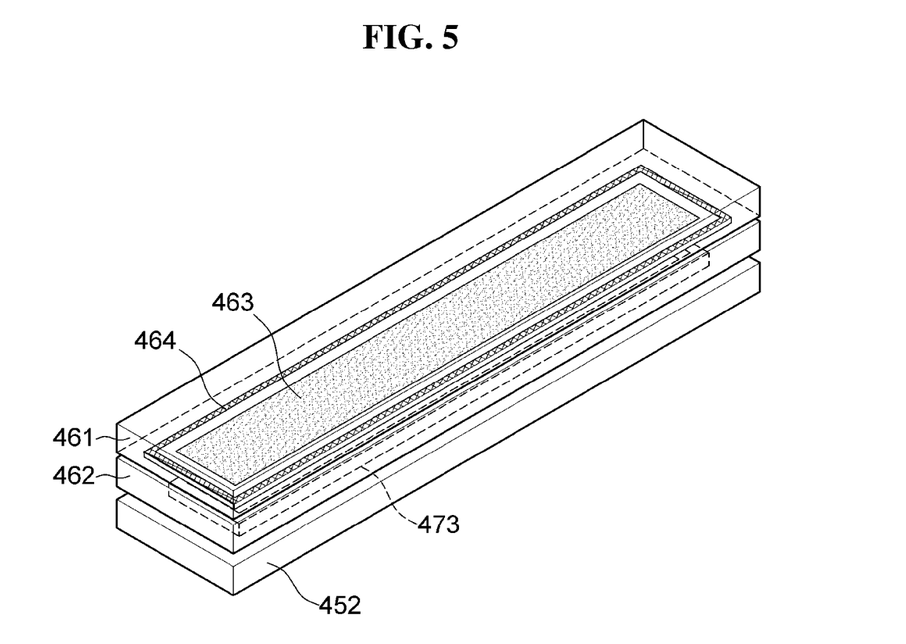
FIG. 5 is a perspective view showing a coupled structure of a wavelength converting unit and a spacer.

Turning now to FIGS. 3 to 5, FIG. 3 is a plan view showing a light source module and a spacer illustrated in FIG. 1, FIG. 4 is an exploded perspective view showing a wavelength converting unit and a spacer and FIG. 5 is a perspective view showing a coupled structure of a wavelength converting unit and a spacer.

With reference to FIGS. 2 to 5, the wavelength converting unit 460 is disposed between the light source unit 450 and the light guide plate 420, and serves to change a wavelength of light emitted from the light source 451. The wavelength converting unit 460 has a panel-bar form (i.e. planar shape) instead of a comparative quantum dot rail having a tube form.

The wavelength converting unit 460 includes a light-transmissive unit 469, a phosphor 463, and a sealing member 464. The light-transmissive unit 469 includes a first glass 461 and a second glass 462. The first glass 461 and the second glass 462 may be made out of a transparent material, such as glass, that allows light to pass through. Further, the first glass 461 and the second glass 462 may include a material for transparent electrodes, such as sapphire, zinc oxide, magnesium oxide, and the like, having high thermal conductivity.

The sealing member 464 bonds the first glass 461 to the second glass 462 and functions as a dam to retain and accommodate the phosphor 463. The sealing member 464 includes frit. More particularly, in a case where the first and the second glasses 461 and 462 are bonded by a thermo-curing sealing process, functions of preventing external moisture infiltration and heat resistance of the wavelength converting unit 460 are improved.

Processes of manufacturing the wavelength converting unit 460 using the sealing member 464 are described below. The first glass 461 has a groove for accommodating the phosphor 463. The phosphor 463 is disposed between the first glass 461 and the second glass 462. The groove refers to an area formed by removing an external surface of the first glass 461 and carving out a predetermined portion of a cross-section of the first glass 461. The phosphor 463 is coated within the groove of the first glass 461, and the sealing member 464 is subsequently coated on one surface of the first glass 461 around the phosphor 463. Then, the second glass 462 is bonded to the sealing member 464, and the sealing member 464 is hardened by a thermo-curing process.

The phosphor 463 is a substance that changes a wavelength of light emitted from the light source 451. For example, the phosphor 463 may be disposed between the blue LED light source and the light guide plate 420 and serves to change blue light emitted from the blue LED light source into white light by converting a wavelength of the blue light.

More particularly, the phosphor 463 may include quantum dot particles. A quantum dot particle is a wavelength conversion particle that converts a wavelength of light to emit light having a specific desired wavelength. Quantum dot particles having different particle sizes may convert to different wavelengths. Therefore, light having desired colors can be emitted by adjusting diameters of the quantum dot particles.

To this end, the phosphor 463 may include a green conversion particle and a red conversion particle that may be quantum dot particles. The green conversion particle has a smaller diameter as compared to the red conversion particle.

The quantum dot particle may produce much stronger fluorescence than a general phosphor, and do so in a small wavelength range. The quantum dot particle may include semiconductor particles, such as CdSe, CdTe, CdS, and the like, that are composed of nano-sized elements of Groups II-VI of the periodic table, in the core of the quantum dot particle. The quantum dot particle has a diameter in a range of, for example, 2 nm to 10 nm, and the particle size may be adjustable where necessary. Here, Group II of the periodic table (aka Group IIA or Group 2) is the column of the periodic table that includes the alkaline earth metals Be, Mg, Ca, Sr, Ba, and Group VI of the periodic table (aka Group VIA or Group 16) refers to the column of the periodic table that includes O, S, Se, Te.

In a case where the quantum dot particle has a small diameter, a wavelength of emitted light becomes shorter, such that blue-based light is produced. In contrast, when the size of the quantum dot particle increases, the wavelength of emitted light becomes longer, such that red-based light is produced.

The quantum dot particle may have a dual structure including an inner core and an outer shell surrounding the inner core. For instance, the quantum dot particle composed of CdSe and ZnS may include an inner core formed of CdSe and an outer shell formed of ZnS.

Hereinafter, a wavelength conversion of light carried out using the quantum dot particle will be described in detail. For example, light emitted from a blue LED light source passes through the quantum dot particle disposed inside the wavelength converting unit 460. The light passing through a small-sized quantum dot particle is converted to green light, the light passing through a large-sized quantum dot particle is converted to red light, and the light propagating between the two quantum dots is not converted and remains as blue light. Then, light having these three colors of red R, green G, and blue B after leaving the wavelength converting unit 460 are mixed, thereby producing white light. In an embodiment, the quantum dot particle having a smaller diameter may be a green conversion particle, and the quantum dot particle having a larger diameter may be a red conversion particle.

Meanwhile, in a case where blue light emitted from the light source 451 passes through the red conversion particle, the blue light is converted into red light. However, although the converted red light may then pass through the green conversion particle, the red light remains as the red light. That is, the green conversion particle may only convert light having wavelengths shorter than the wavelength of green light, and thus the red light passing through the green conversion particle is not converted and remains as the red light. This is because of the energy conservation principle and the fact that a red photon has less energy than a green photon according to the equation $E=h/\lambda$, where E is energy of the photon and h is a constant, and thus quantum dots and phosphors are not capable of producing a higher energy photon from a relatively lower energy photon.

The quantum dot particles have predetermined band gaps formed depending on the sizes of the quantum dot particles. Therefore, in a case where a wavelength longer (i.e. lower energy photon) than a specific wavelength is incident, the wavelength is not converted when passing through the quantum dot particle.

On the contrary, in a case where blue light emitted from the light source 451 passes through the green conversion particle before passing through the red conversion particle, the blue light is converted into green light upon passing through the green conversion particle, and part of the converted green light is converted into red light upon passing through the red conversion particle, because each of these conversions result in a photon having less energy than before. Therefore, the wavelength converting unit 460 may produce light having a desired color by adjusting amounts of quantum dot particles including green conversion particles and red conversion particles.

As illustrated in FIG. 3, the spacer 473 is disposed on circuit substrate 452, is arranged around the plurality of light sources 451, while being spaced apart from the light source 451. As illustrated in FIG. 4, the spacer 473 has an opening toward a light-emitting direction (i.e. in the direction of the light guide plate) of the light source 451 and is disposed on side surfaces of the light source 451.

The spacer 473 may be made out of photosetting resins or thermosetting resins that have excellent light transmittance and adhesion properties. For example, the spacer 473 may be made out of coating resins, such as thermosetting silicon, and applying heat thereto.

Referring now to FIGS. 4 and 5, the wavelength converting unit 460 is disposed on the light source unit 450 on which the spacer 473 is formed. Magenta, cyan or red, yellow or green phosphor may be filled inside the spacer 473 and on the light source 451 to convert a color of light. The spacer 473 is configured to fix the wavelength converting unit 460 to the light source unit 450 and to protect the light sources 451 from external shock. In other words, as described above, when the spacer 473 is used, an additional mold frame for fixing the wavelength converting unit 460 to the light source unit 450 is not required. Also, when the spacer 473 is included, the light source unit 450 and the wavelength converting unit 460 can be manufactured together as a single unit, and then be disposed inside the backlight assembly, thereby improving process efficiency and reducing manufacturing costs.

Figure 7:
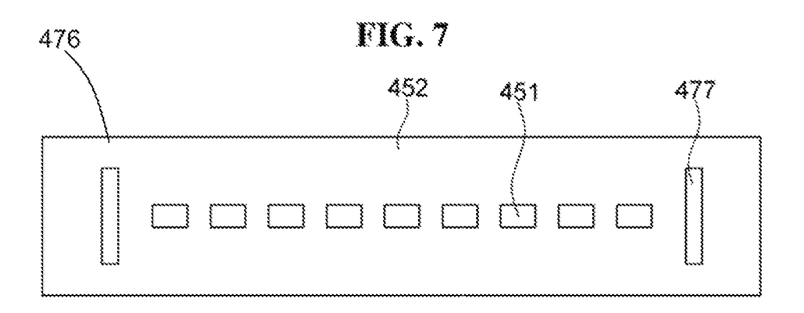
FIG. 7 is a plan view showing a spacer according to a third embodiment of the present invention.
Figure 8:
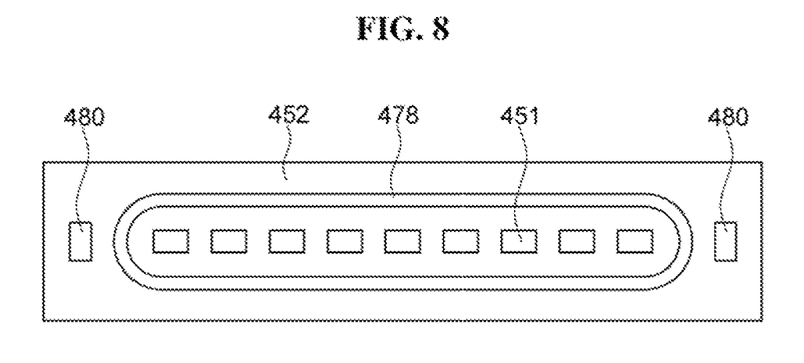
FIG. 8 is a plan view showing a spacer and a metal pattern as per a fourth embodiment of the present invention.
Figure 9:
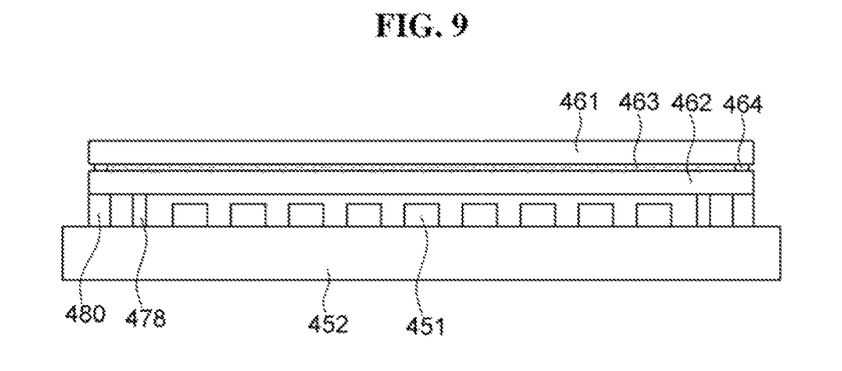
FIG. 9 is a cross-sectional view showing a spacer and a metal pattern of FIG. 8 per a fourth embodiment of the present invention.

Hereinafter, other embodiments of the present invention will be described with reference to FIGS. 6 to 9. Turning now to FIGS. 6 to 9, FIG. 6 is a plan view showing a spacer according to a second embodiment of the present invention, FIG. 7 is a plan view showing a spacer according to a third embodiment of the present invention, FIG. 8 is a plan view showing a spacer and a metal pattern according to a fourth embodiment of the present invention and FIG. 9 is a cross-sectional view showing a spacer and a metal pattern of FIG. 8.

Figure 6:
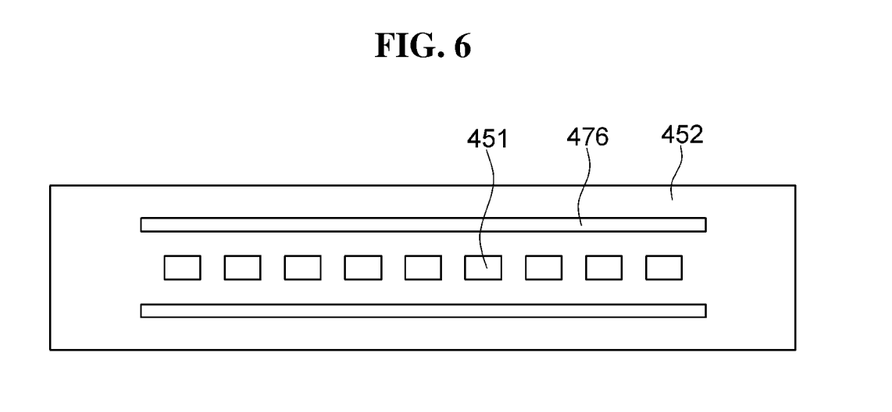
FIG. 6 is a plan view showing a spacer according to a second embodiment of the present invention.

Referring now to FIG. 6, a spacer 476 according to the second embodiment of the present invention includes a first spacer and a second spacer that face each other with a light source 451 interposed therebetween, the first and second spacers corresponding to the long side portions of the circuit substrate 452. At the short side portion of the circuit substrate 452 and unlike the spacer of FIG. 3, the spacer 476 of FIG. 6 is open.

Referring now to FIG. 7, a spacer 477 according to the third embodiment of the present invention includes only portions that correspond to the short sides of the circuit substrate 452, while portions that correspond to the long sides are open. The spacers 476 and 477 of FIGS. 6 and 7 have structures that allow a wavelength converting unit 460 to be fixed to the light source unit 450 using minimal amounts of materials.

Referring now to FIGS. 8 and 9, a metal pattern 480 is formed in addition to the spacer 478 in order to fix the wavelength converting unit 460 to the light source unit 450. In FIGS. 8 and 9, the metal patterns 480 are external to spacer 478 and are arranged closer to the short sides of circuit substrate 452 than spacer 478. The metal pattern 480 may be separately formed in order to support, along with the spacer 478, the wavelength converting unit 460. Further, instead of separately forming the metal pattern 480, a Zener diode can instead be formed on the circuit substrate 452 instead of the metal pattern 480.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A backlight assembly, comprising:
a circuit substrate;
a light source arranged on the circuit substrate;
a light guide plate having a first surface configured to receive light emitted from the light source and a second and different surface to emit light;
a wavelength converting unit arranged between the light source and the light guide plate; and
a spacer arranged around the light source,
wherein:
the light source comprises a plurality of light sources;
the spacer has a closed-loop shape surrounding the plurality of light sources;
the spacer includes first, second, third, and fourth sides;
the first and second sides face each other;
the third and fourth sides face each other;
the third side is longer than the first side;
the fourth side is longer than the second side; and
the first and second sides have round shapes.

2. The backlight assembly of claim 1, wherein the spacer is arranged between the circuit substrate and the wavelength converting unit.

3. The backlight assembly of claim 2, wherein the plurality of light sources are arranged in an alignment direction, the third side and the fourth side of the spacer being arranged parallel to the alignment direction.

4. The backlight assembly of claim 2, wherein the wavelength converting unit comprises a light transmission unit that allows the light emitted from the light source to pass through.

5. The backlight assembly of claim 4, wherein the light transmission unit comprises a first glass and a second glass arranged to face each other.

6. The backlight assembly of claim 5, wherein the wavelength converting unit further comprises a phosphor arranged between the first glass and the second glass.

7. The backlight assembly of claim 6, wherein the wavelength converting unit comprises a sealing member configured to bond the first glass to the second glass.

8. The backlight assembly of claim 7, wherein the second glass is completely spaced-apart from the first glass by the sealing member.

9. The backlight assembly of claim 6, wherein the phosphor comprises a plurality of quantum dot particles.

10. The backlight assembly of claim 9, wherein the phosphor comprises a green conversion particle and a red conversion particle, wherein the green conversion particle has a smaller diameter than the red conversion particle.

11. The backlight assembly of claim 5, wherein each of the first glass and the second glass being planar.

12. The backlight assembly of claim 5, wherein the second glass is completely spaced-apart from the first glass.

13. The backlight assembly of claim 5, wherein the wavelength converting unit has a planar shape.

14. The backlight assembly of claim 1, wherein the spacer has an opening toward a light-emitting direction of the light emitted from the plurality of light sources.

15. The backlight assembly of claim 1, further comprising a metal pattern spaced apart from the spacer and configured to support the wavelength converting unit.

16. The backlight assembly of claim 1, wherein the wavelength converting unit has a shaped selected from a bar and a line.

17. The backlight assembly of claim 1, wherein the first and second sides are symmetrical with each other.

* * * * *